United States Patent [19]

Lawrence

[11] Patent Number: 5,199,826
[45] Date of Patent: Apr. 6, 1993

[54] PUMP UNLOADING TRAILER CONTAINER FOR POWDERED BULK MATERIAL

[76] Inventor: James C. Lawrence, 851 Harrison, Valparaiso, Ind. 46383

[21] Appl. No.: 836,785

[22] Filed: Feb. 14, 1992

[51] Int. Cl.$^5$ .............................................. B60P 1/60
[52] U.S. Cl. ........................................ 406/41; 406/39; 406/137; 406/145
[58] Field of Search ................ 406/136, 137, 145, 39, 406/41; 414/507, 491; 222/195; 298/24, 26, 1 R, 1 V

[56] References Cited

U.S. PATENT DOCUMENTS

| | | | |
|---|---|---|---|
| 1,970,405 | 8/1934 | Thomas | 406/137 X |
| 2,374,584 | 4/1945 | Cannon | 406/136 X |
| 2,494,500 | 1/1950 | Andres . | |
| 2,589,968 | 3/1952 | Schemm | 222/195 X |
| 3,251,497 | 5/1966 | Simas . | |
| 3,265,232 | 8/1966 | Lythgoe . | |
| 3,301,604 | 1/1967 | Berry | 406/137 X |
| 3,917,354 | 11/1975 | Adams, Jr. . | |
| 4,247,228 | 1/1981 | Gray et al. . | |
| 4,400,131 | 8/1983 | Blake | 406/137 X |
| 4,449,861 | 5/1984 | Saito et al. . | |
| 4,842,449 | 6/1989 | Nelson . | |
| 4,875,811 | 10/1989 | Merrett et al. . | |
| 4,900,200 | 2/1990 | Harumoto et al. . | |
| 4,993,883 | 2/1991 | Jones . | |

FOREIGN PATENT DOCUMENTS

| | | | |
|---|---|---|---|
| 725370 | 3/1955 | United Kingdom | 222/195 |
| 753190 | 7/1956 | United Kingdom | 406/39 |
| 1029909 | 5/1966 | United Kingdom | 406/39 |

*Primary Examiner*—Russell D. Stormer
*Assistant Examiner*—Gary C. Hoge
*Attorney, Agent, or Firm*—Richard G. Kinney

[57] ABSTRACT

A trailer especially useful for transporting and unloading bulk powdered material that tends to clump or clod under slight compacting is disclosed, which trailer includes a generally enclosed compartment for holding the bulk material, an air vent at an upward part of the compartment, and has a bottom floor to the compartment equipped with means for injecting air under pressure, which air travels through the material and exits at the vent and serves to mobilize and fluidize the powdered material in the compartment and allows it to flow by gravity down the floor toward an exit wherein it is removed. The particular trailer disclosed is converted from a conventional rectilinear combination or box trailer by the addition of a double set of pipes in the floor, which pipes are supplied during unloading with air from outside the trailer while the trailer is tilted upward on its rear wheels to slant its floor toward the rear wherein an exit manifold is provided for pumping out the fluidized bulk material.

3 Claims, 4 Drawing Sheets

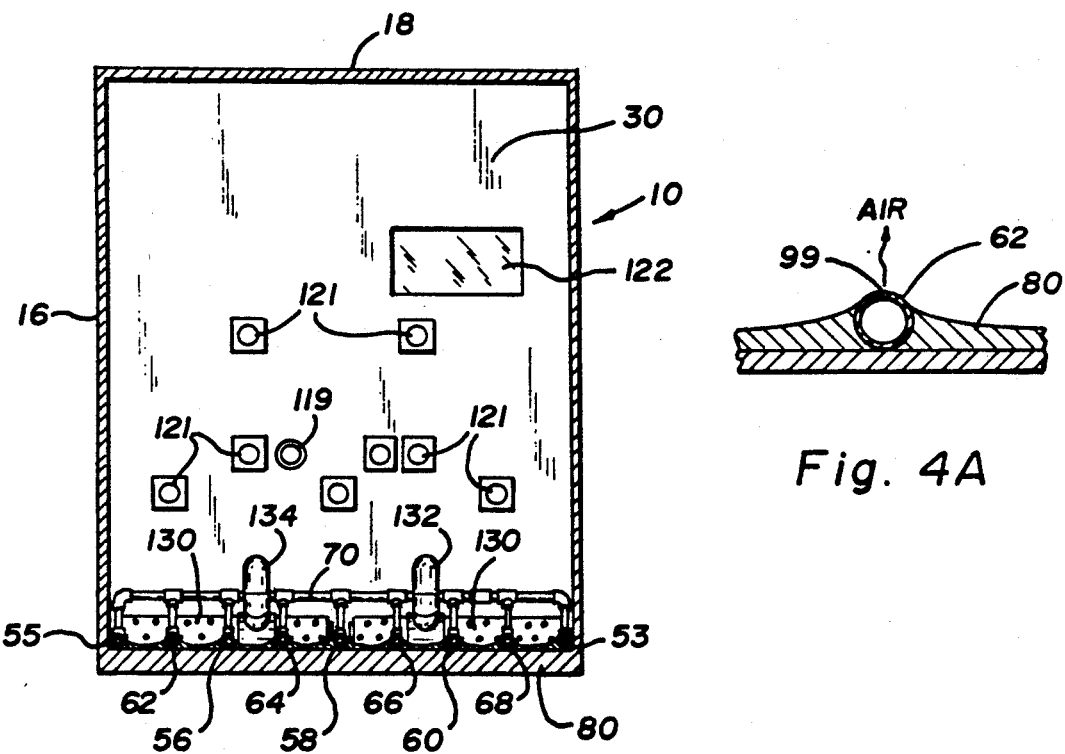
Fig. 4A
Fig. 5
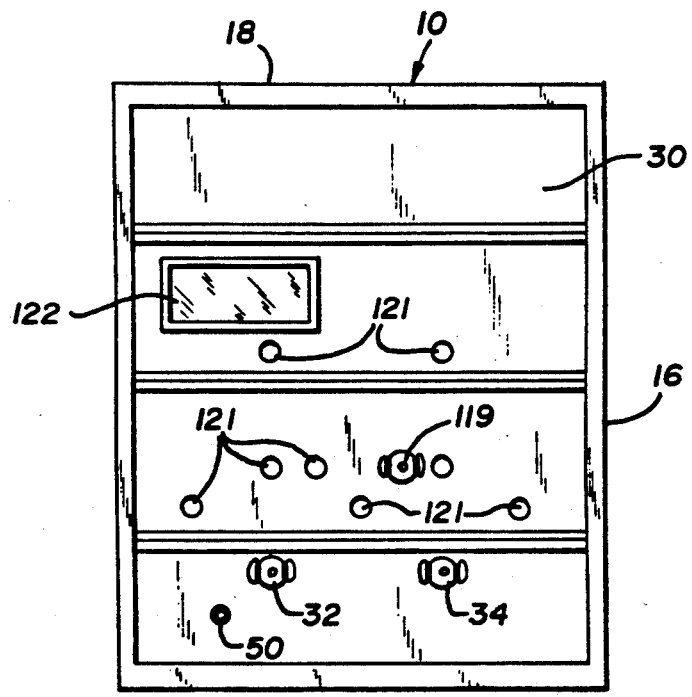
Fig. 6

PUMP UNLOADING TRAILER CONTAINER FOR POWDERED BULK MATERIAL

FIELD OF THE INVENTION

The present invention is related to an improved container such as a trailer for holding powder bulk material and to the method for unloading of such material.

BACKGROUND OF THE INVENTION

Certain powder bulk materials, such as certain rare earths and silica gel are difficult to handle because of their tendency to clump or clod when compacted. If shipped in a closed large volume container, such as a tank car or trailer, this type of material is subject to settling and clumping due to the normal shocks and movement it receives during transport. As such, such material may not be easily removed from such a container.

While various trailers and containers have in the past tried difficult unloading schemes, these have heretofore failed to provide an easy and economical manner of unloading bulk shipped powder materials of this type. Such prior unloading systems include those shown in the following U.S. Pat. Nos. 4,247,228; 2,494,500; 3,251,497; 4,993,883; 4,900,200; 4,875,811; 4,842,449; 4,449,861; 3,917,354; and 3,265,232. Some of these prior art approaches involve aspiration of the product by injecting air under pressure into a closed container at the exit from the container and extracting the product entrained with air. While that approach may work well with some types of products, if applied to clodding powder bulk materials, it would have the drawback of fluidizing and removing product only at the area of the exits and of producing an output that was largely air. This latter drawback would require provision for screening out or settling out of the powder after it was discharged from the container.

The present invention provides a system for unloading such bulk material which does not involve removing the material mixed with a large volume of air and which also allows for the removal and fluidizing of substantially all of the material during unloading so that substantially all of the bulk material may be automatically unloaded with little or no need of direct human labor in handling the material.

SUMMARY OF THE INVENTION

In accordance with the present invention, a container, e.g. a container on wheels such as an over-the-road trailer, is provided with an enclosed volume for containing powder bulk material. The upper part of the volume has a vent for gas or air and the lower part an exit for unloading the material. One preferred exit may be a manifold which may be coupled to a diaphragm pump for pumping powder from the container. In accordance with the present invention, during unloading, the floor of the container is slanted at a steep angle and air is injected upward at spread-apart points from the floor into the powder bulk material. The air serves to fluidize the bulk powder but the air is substantially vented out of the container through the upper vent. The air flow serves to aid the fluidized powder to flow by gravity to the exit where it is unloaded without substantial amounts of contained air.

Prototype trailers have been constructed in accordance with the invention, tested, and it shown that the injection of air in this manner will sufficiently fluidize the bulk material that it may be easily pumped out of the exit, with the pumped material not including excessive quantity of air.

One advantage of the present invention is that it allows the retrofitting of existing box or van semitrailers into bulk container trailers and the present invention has as one of its features such a conversion trailer.

The invention, together with further advantages and features thereof, may best be understood by reference to the following description taken in connection with the accompanying drawings, in the several figures of which like reference numerals identify like elements.

BRIEF DESCRIPTION OF THE DRAWINGS

FIG. 4A is a partial sectional elevation view of a portion of the trailer of FIGS. 1-4 as seen from the line 4—4 shown on an enlarged scale to show detail.

FIG. 5 is a sectional elevational view of the trailer of FIGS. 1-4 as seen from the line 5—5 in FIG. 2 when looking in the direction of the arrows in that figure.

FIG. 6 is a rear-end elevational view of the trailer of FIGS. 1-5.

DETAILED DESCRIPTION OF ONE PREFERRED EMBODIMENT

Figure 1:
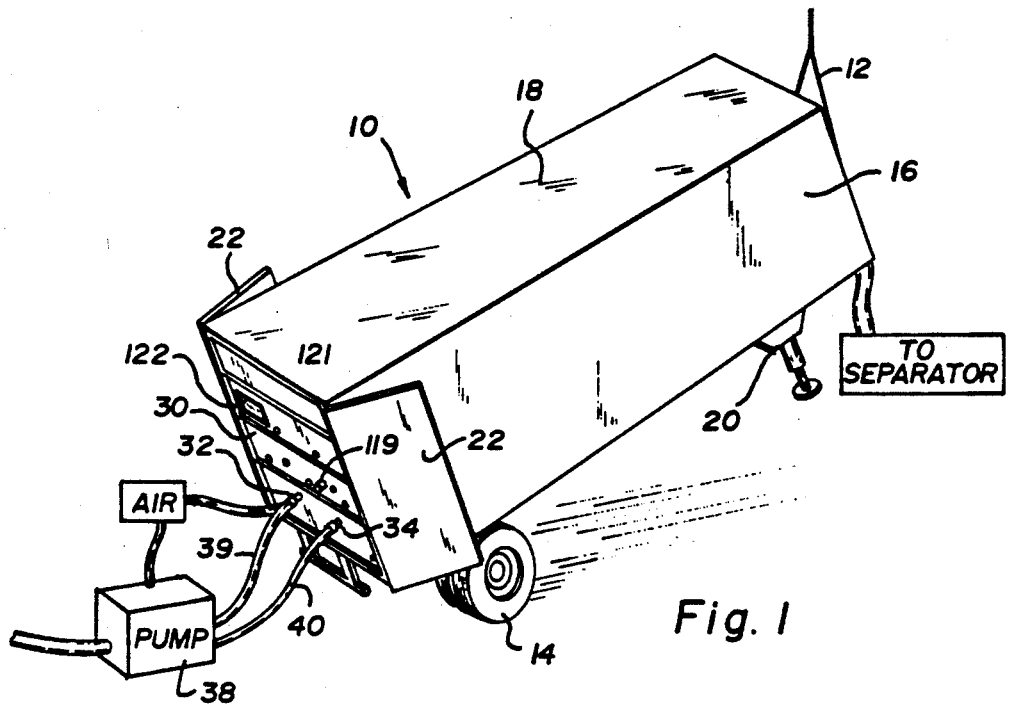
FIG. 1 is a perspective view of a container-trailer constructed in accordance with the present invention, shown being unloaded with auxiliary equipment.

Referring to the figures, there is depicted a trailer 10 incorporating the principles of the present invention and which may be used to practice the inventive method of unloading bulk powder. With reference initially to FIG. 1, there is depicted the trailer in the process of unloading such bulk material.

The trailer 10 is, outside, similar to conventional over-the-road semitrailer vans. Indeed, prototypes of the invention have been made by modifying such conventional trailers. The trailer 10 thus includes a conventional single wheel set carriage unit 14, sidewalls such as the wall 16, a roof 18, a support leg unit 20 and rear doors 22.

Figure 2:
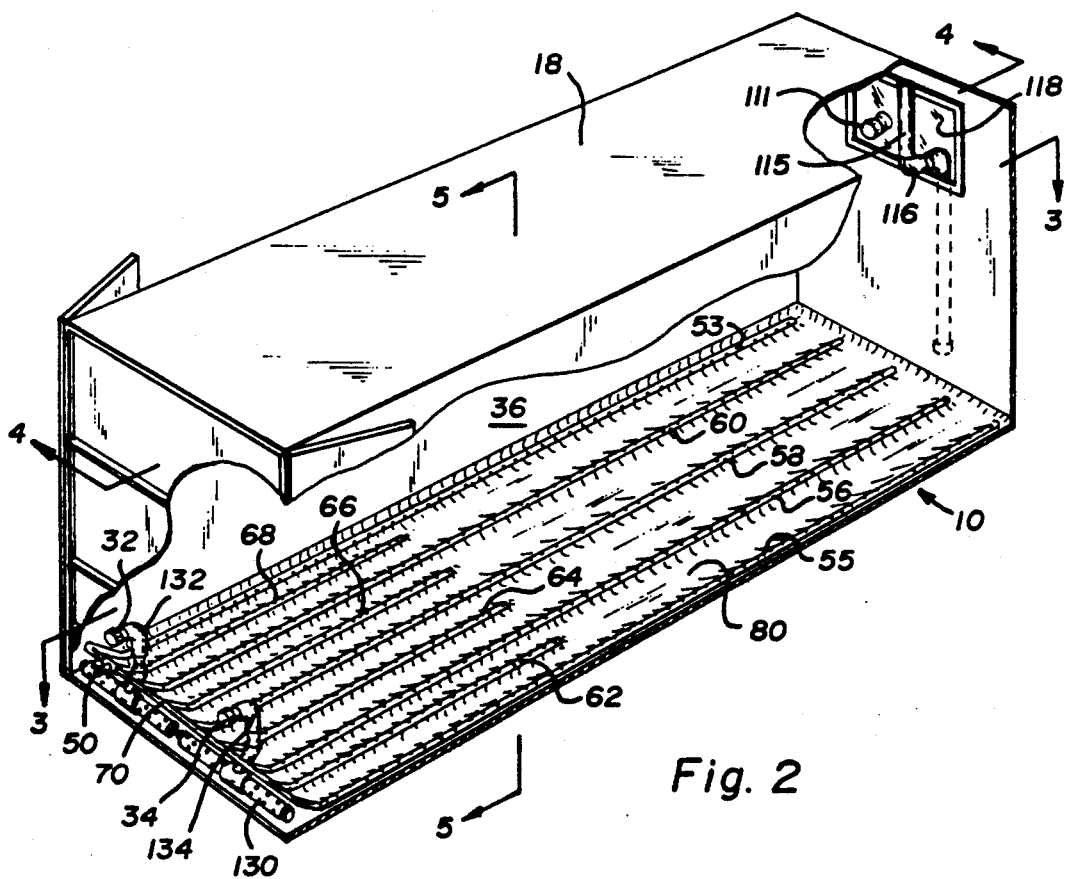
FIG. 2 is a perspective view of the trailer of FIG. 1 with parts broken away to show interior configuration.

In accordance with the present invention, the trailer constitutes a container for bulk powder material with a novel rear wall 30. The rear wall 30 is recessed slightly into the trailer and covered by the conventional doors 22 during transport. The rear wall 30 is equipped with exits 32, 34 for removing the powder bulk material from the interior volume 36 (FIG. 2) by means of a pump 38 (FIG. 1) and hoses 39, 40. The pump, which may be entirely conventional, is depicted symbolically in FIG. 1. Such a pump unit might be a double diaphragm pump such as those sold under the WILDEN ® mark by Wilden Pump & Engineering Company of Colton, Calif. Such pumps are powered by air pressure and can be configured to employ a pair of inputs such as the flexible hoses 39 and 40.

Figure 3:
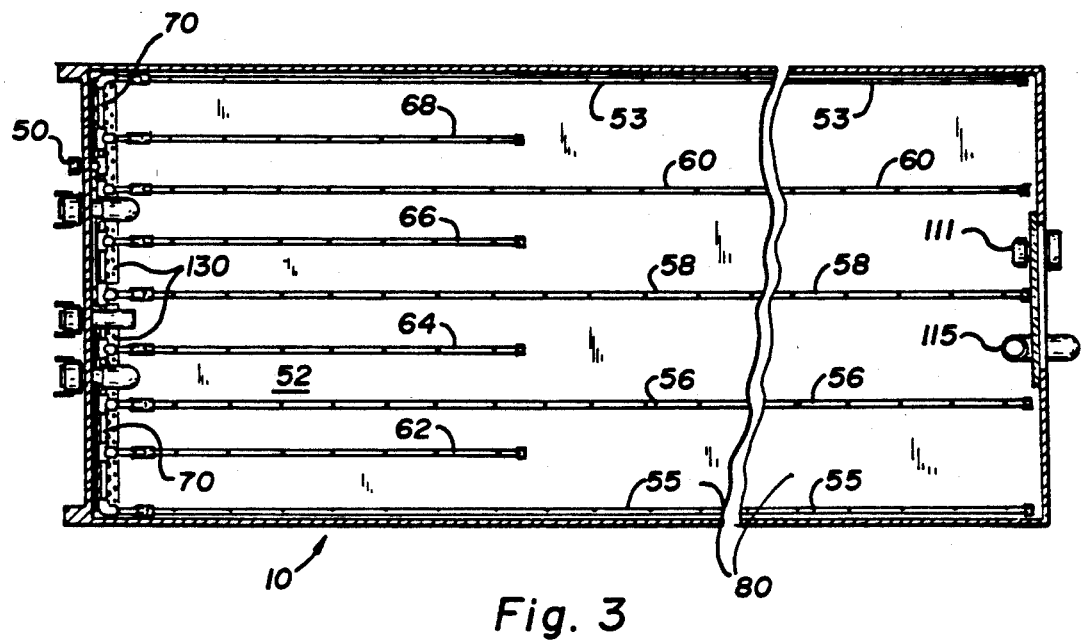
FIG. 3 is a sectional plan view of the trailer of FIGS. 1 and 2 as seen from the line 3—3 in FIG. 2 when loading in the direction of arrows in that figure.
Figure 4:
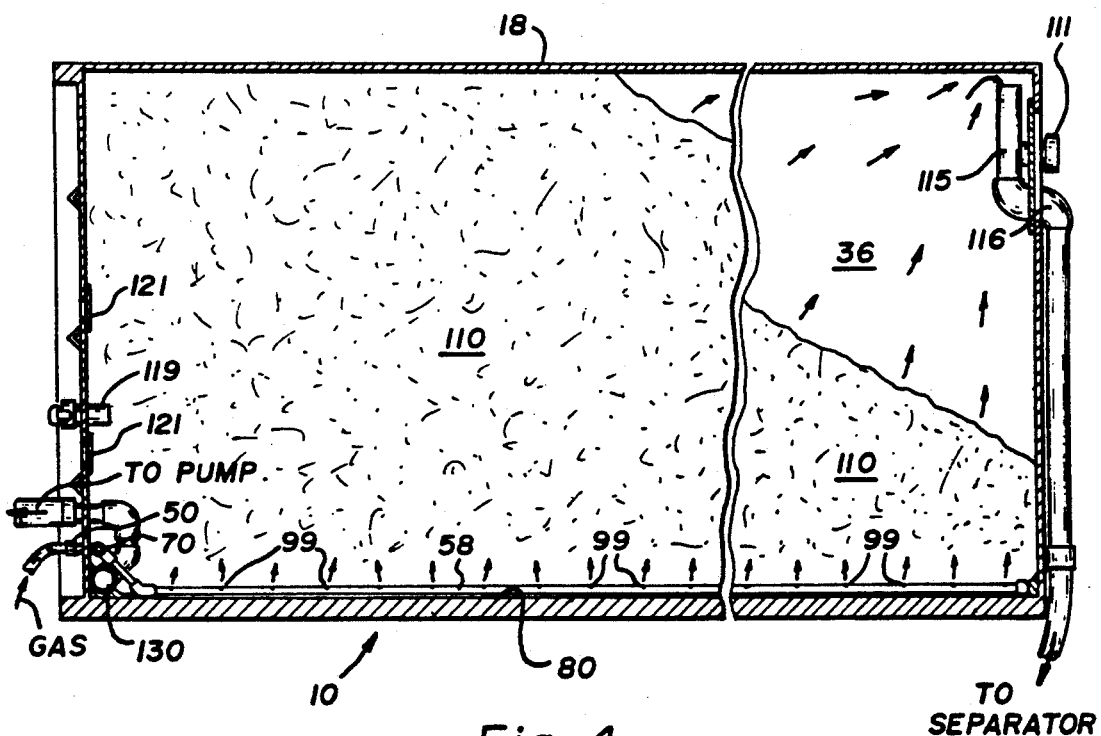
FIG. 4 is a sectional elevational view of the trailer of FIGS. 1-3 as seen from the line 4—4 in FIG. 2 when looking in the direction of the arrows in that figure.
Figure 7:
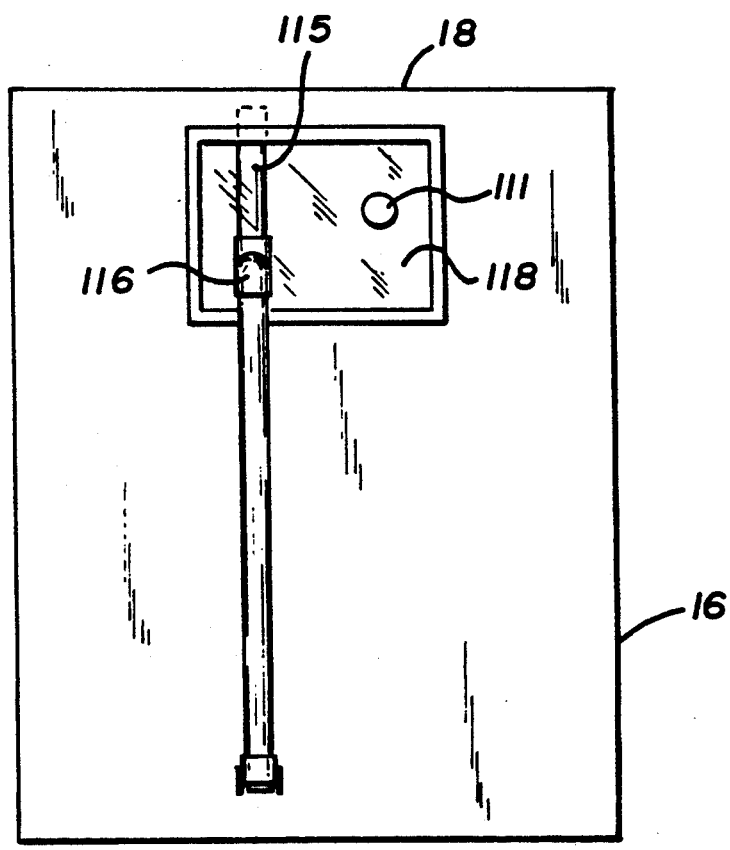
FIG. 7 is a front end elevational view of the trailer of FIGS. 1-6.

In accordance with one feature of the present invention, the trailer 36 is equipped with a gas input 50, best shown in FIG. 3. The gas input 50 feeds gas, commonly compressed air, into a system of longitudinally extending tubes or pipes 52, including side pipes 53 and 55, three equally spread apart long pipes 56, 58 and 60, and a set of shorter pipes 62, 64, 66 and 68, which are placed between the longer pipes. The ends of these pipes 55-68, are capped and their bases are connected together to inlet 50 by connector lines 70. Each of these pipes is mounted on the floor 80, which is curved to smoothly almost cover the piping. (Alternatively, the piping may be positioned entirely below a flat floor with provision for air nozzles to feed air from the piping through the floor.) The piping is provided with small outlet nozzles 99 (FIGS. 1 and 4A) which expel air under pressure (arrows in FIG. 4 at 4A) to break up and fluidize the powder material 110 in the container 36. The air exiting from the material 110 is vented out of a standpipe 115 located near the top front of the container 36 and into a dust collector.

The front of the trailer 10 preferably has a window 118 (through which the vent pipe 116 passes) for visually checking the height of material in the trailer. Also through this window is a capped access pipe 111 which can be used to insert a fill alarm for use while filling the container. The rear wall 30 (FIGS. 1 and 4) of the trailer is equipped with an inlet 119 through which powder material may be pumped (preferably with the trailer level) and a plurality of porthole-like windows 121 and a manhole 122 made of plexiglass, all of which can be used to visibly inspect the interior of the trailer 10 from the exterior.

The material exit from the trailer 10 includes a pair of large holed manifolds 130, into which the powdered material is drawn and from which it is moved via piping 132 and 134 and exit ports 32 and 34.

The trailer 10 is as depicted a conventional box or van semitrailer which has been modified in accordance with the present invention by the possession of the vent 115, exits 130, 132, 134, 32, 34, and floor gas injection system 55-68, 70. An additional wall, separate wall 30, is preferable and the inside of the trailer is preferably as shown lined with food-safe plastic. A drain plug (not shown) is preferably included for hosing out the interior.

A prototype trailer of this construction was made, tested and proved to work well. For purposes of illustration and not for purpose of limitation, some of the specific components of this prototype are set out below. Of course, the present inventor may well decide to change these specifications in the future for reasons of economy or as experience dictates or to adapt the invention to differing circumstances, but they are his current best mode of practicing this invention. Also, the reader is cautioned to verify these values experimentally or mathematically to guard against any error in transcription.

One prototype for the trailer 10 was approximately 27'×8×13¼ feet in size and was converted from a van trailer manufactured by Comet and known as a pup trailer. The wall 30 was made of steel, the piping 53-68 was constructed of CPVC plastic pipe, ¾ inches in diameter, with nozzles or opening 99 being approximately 1/16 inches in diameter and with the holes spread approximately every 8 inches along the pipe. The manifolds 130 were constructed of CPVC plastic pipe having a diameter of 3 inches, with 1 inch diameter openings made 16 per foot. The vent 115, 116 was constructed of a similar pipe (without holes). The inside walls, ceiling and floor of the trailer were lined with FRP plastic sheeting. The piping and sheeting was secured by food grade glue and stainless steel screws to the inside floor and walls of the pup trailer.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

For example, although the invention has been shown in use with a box van semi-trailer, it can, at least in its broader aspects, be applied to tank trailers, railroad cars and other containers. Also although the gas is shown supplied by tubing it may be applied in other ways and the supply system may include means for limiting flow and increasing pressure at various areas or zones, for example for switching all of the flow to the rear of the floor when the level of powdered material remaining has dropped so as to expose the front of the floor.

I claim:

1. A converted trailer for transportation of powder bulk material of the type which may be subject to clodding or clumping during transport, said converted trailer comprising a conventional box trailer of the type that has a front, rear and rear wheel carriage and a floor, comprising means enclosing the interior of said trailer to make it substantially leak-proof to such powder bulk material, a vent from the top front of the interior of the trailer, exit means at the rear bottom of the interior of said trailer, and gas injection means for injecting gas at the floor of said trailer to fluidize such material therein during unloading, said means for injecting including a larger number of gas injection points at the floor area adjacent the rear bottom and a smaller number of gas injection points at the floor area near the front of the trailer, said trailer also having means whereby the trailer may be pivoted during unloading about said rear wheel carriage, said means including said rear wheel carriage, so that its floor slants downward toward said exit means during unloading.

2. A trailer for transportation of powder bulk material of the type which may be subject to clodding or clumping during transport, said trailer of the type that has a front, rear and rear wheel carriage and an interior volume for carrying said material including a floor including means enclosing the interior of said trailer to make it substantially leak-proof to such powder bulk material, a vent from the top front of the interior of the trailer, exit means at the rear bottom of the interior of said trailer, and gas injection means for injecting gas at the floor of said trailer to fluidize such material therein during unloading, said means for injecting including a larger number of gas injection points at the floor area adjacent the rear bottom and a smaller number of gas injection points at the floor area near the front of the trailer, said trailer also have means whereby the interior portion of the trailer may be pivoted during unloading so that its floor slants downward toward said exit means during unloading.

3. A trailer for transportation of powder bulk material of the type which may be subject to clodding or clumping during transport, said trailer of the type that has a front, rear and rear wheel carriage and an enclosed interior having a floor, which interior is substantially leak-proof to such powder bulk material, a vent from the top front of the interior of the trailer, exit means at the rear bottom of the interior of said trailer, and gas injection means for injecting gas at the floor of said trailer to fluidize such material therein during unloading, said trailer also having means whereby the trailer may be pivoted during unloading about said rear wheel carriage, said means including said rear wheel carriage so that its floor slants downward toward said exit means during unloading.

* * * * *